US008917742B2

(12) United States Patent
Ertugay et al.

(10) Patent No.: US 8,917,742 B2
(45) Date of Patent: Dec. 23, 2014

(54) MECHANISM TO SAVE SYSTEM POWER USING PACKET FILTERING BY NETWORK INTERFACE

(75) Inventors: Osman N. Ertugay, Bellevue, WA (US); David G. Thaler, Redmond, WA (US); Mahender Hari, Redmond, WA (US); Andrew J. Ritz, Sammamish, WA (US); Alireza Dabagh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 13/182,195

(22) Filed: Jul. 13, 2011

(65) Prior Publication Data

US 2013/0019042 A1 Jan. 17, 2013

(51) Int. Cl.
- H04L 12/56 (2006.01)
- H04L 12/28 (2006.01)
- G06F 13/38 (2006.01)
- G06F 1/32 (2006.01)
- H04L 12/935 (2013.01)

(52) U.S. Cl.
CPC ............... *G06F 1/3209* (2013.01); *H04L 49/30* (2013.01); *G06F 13/385* (2013.01); *Y02B 60/1235* (2013.01); *G06F 1/329* (2013.01)
USPC .......................................... 370/419; 709/250

(58) Field of Classification Search
None
See application file for complete search history.

(56) References Cited

U.S. PATENT DOCUMENTS

| 6,904,519 | B2 | 6/2005 | Anand et al. |
| 7,693,146 | B2 | 4/2010 | Subramanian |
| 7,843,915 | B2 | 11/2010 | Kashyap |
| 2008/0239988 | A1 | 10/2008 | Ptasinski et al. |
| 2008/0240140 | A1 | 10/2008 | Dabagh et al. |
| 2009/0125739 | A1* | 5/2009 | Satoh ............................ 713/322 |
| 2010/0039971 | A1 | 2/2010 | Lor et al. |
| 2010/0106874 | A1* | 4/2010 | Dominguez et al. .......... 710/260 |
| 2010/0165897 | A1* | 7/2010 | Sood ............................. 370/311 |

OTHER PUBLICATIONS

"Wire-Speed Hardware-Assisted Traffic Filtering with Mainstream Network Adapters"—Published Date: Oct. 28, 2010; http://luca.ntop.org/nema2010.pdf.
"Methods for Identifying Unwanted Network Traffic"—Published Date: Oct. 11, 2007; http://www.tml.tkk.fi/Publications/C/25/papers/Lehmus_final.pdf.
"Putting it on the NIC: A Case Study on application offloading to a Network Interface Card (NIC)"—Published Date: Jan. 8-10, 2006; http://www.cs.nctu.edu.tw/~cyku/articles/01593191.pdf.

* cited by examiner

*Primary Examiner* — Marcus R Smith
(74) *Attorney, Agent, or Firm* — John Jardine; David Andrews; Micky Minhas

(57) ABSTRACT

A network interface that connects a computing device to a network may be configured to process incoming packets and determine an action to take with respect to each packet, thus decreasing processing demands on a processor of the computing device. The action may be indicating the packet to an operating system of the computing device immediately, storing the packet in a queue of one or more queues or discarding the packet. When the processor is interrupted, multiple packets aggregated on the network interface may be indicated to the operating system all at once to increase the device's power efficiency. Hardware of the network interface may be programmed to process the packets using filter criteria specified by the operating system based on information gathered by the operating system, such as firewall rules.

20 Claims, 7 Drawing Sheets

MECHANISM TO SAVE SYSTEM POWER USING PACKET FILTERING BY NETWORK INTERFACE

BACKGROUND

As computing devices become more versatile and ubiquitous, the demands on their performance increase. Users expect a computer to perform a variety of functions at a high speed without consuming excessive amounts of power. Furthermore, many computing devices are portable and rely on a battery for power. Battery life may limit the use of a portable device when another power source is not available. With the expansion of processing capability of computer hardware, power consumption of the computing device is a growing concern.

Most computers, including portable and hand-held computers, are connected to one or more networks. A computer connects to a network through a network interface. A network interface in the computer typically includes a physical network interface device and a software driver that provides a programming interface to the physical network interface device. For example, a network interface card (NIC) may act as a network interface in a computer. The NIC participates both in transmitting and receiving a wide range of data over a network.

When the NIC receives a packet over a network, the NIC may notify processing circuitry of the computer of the packet. If the computer is operating in a low power mode (e.g., in a sleep mode) when the packet is received, a signal may be generated to wake up the computer so that it can then process the packet.

SUMMARY OF INVENTION

To alleviate processing burden on a computing device, a network interface used to connect the computing device to a network may be configured to process incoming network traffic within its processing circuitry separate from a processor of the computing device. The network interface may process each packet that arrives from a network to determine an action to perform with respect to the packet. The action, for example, may be notifying a processor of the computing device of the packet immediately, delaying the packet (e.g., storing in a queue) or dropping the packet. The network interface may be, for example, a network interface card (NIC), processing circuitry of a network gateway device, such as a router, or any other network interface component. More than one network interface may connect the computing device to one or more networks, and one or more of these interfaces may process incoming packets in accordance with techniques described herein. Though the specific format of the network interface is not critical to the invention, a NIC is used herein as an example of a suitable network interface.

The NIC may determine a specific action based on sets of criteria supplied from an operating system of the computing device. The operating system may specify criteria for the NIC to identify whether a received packet is of immediate interest or whether the packet may be deemed by the computing device as "noisy" network traffic. When the packet is of immediate interest, the NIC may indicate such packet to the operating system immediately. However, a "noisy" packet that may not need to be processed by the main processor of the computing device may be discarded by the NIC.

Alternatively, the packet, though not of immediate interest, may still be of interest, but a certain delay in its indication may be acceptable. Such packets may be stored on the network interface or in other location to increase the likelihood that the received packet can be handled in a power efficient way. The packet may be stored until the processor is in a state in which it can process the packet with little additional power usage, such as when the processor is otherwise in an awake state. Alternatively or additionally, the packet may be stored until it can be aggregated with other packets that can be indicated to the operating system together to save on processing overhead to respond to each indicated packet. The processor may be interrupted to indicate packets based on any of a number of triggers, such as when a packet classified as of immediate interest is indicated to the operating system, a queue becomes full, a packet has been in a queue longer than a time limit set for the queue, or when any other suitable condition is met.

Using a single interrupt to indicate multiple packets to the processor may increase power efficiency of the computing device. The processor of the computing device may thus perform other useful functions instead of spending valuable energy responding to unnecessary interrupts. When the computing device is operating in a low power mode, making decisions with respect to incoming packets on the NIC in accordance with the techniques described herein may increase duration of idle intervals in which the main processor may remain in the low power mode. Longer idle intervals may reduce power usage of the computing device, which may be particularly useful when the device operates on a battery. Furthermore, user experience may be improved because a time during which the user may utilize the computing device (e.g., a portable device) using a battery as a power source may be extended.

Hardware of the NIC may be programmed to perform the processing of incoming packets using sets of filter criteria specified by the operating system. The operating system may collect various information from the computing device and from the NIC and infer from the information what type of traffic and/or under what condition to treat as "noisy" to the computing device. The determination may be based on multiple conditions, including but not limited to a type of a network to which the computer system is connected via the NIC, firewall rules and a location of the computing device.

When programmed with the sets of filter criteria, the NIC may apply the criteria to each incoming packet to determine whether parameters associated with the packet match one or more sets of filter criteria. When the parameters of the packet match one or more sets of filter criteria, an action specified in the matching filter may be taken with respect to the packet. When no matching filter is identified, the NIC may immediately indicate the packet to the operating system.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
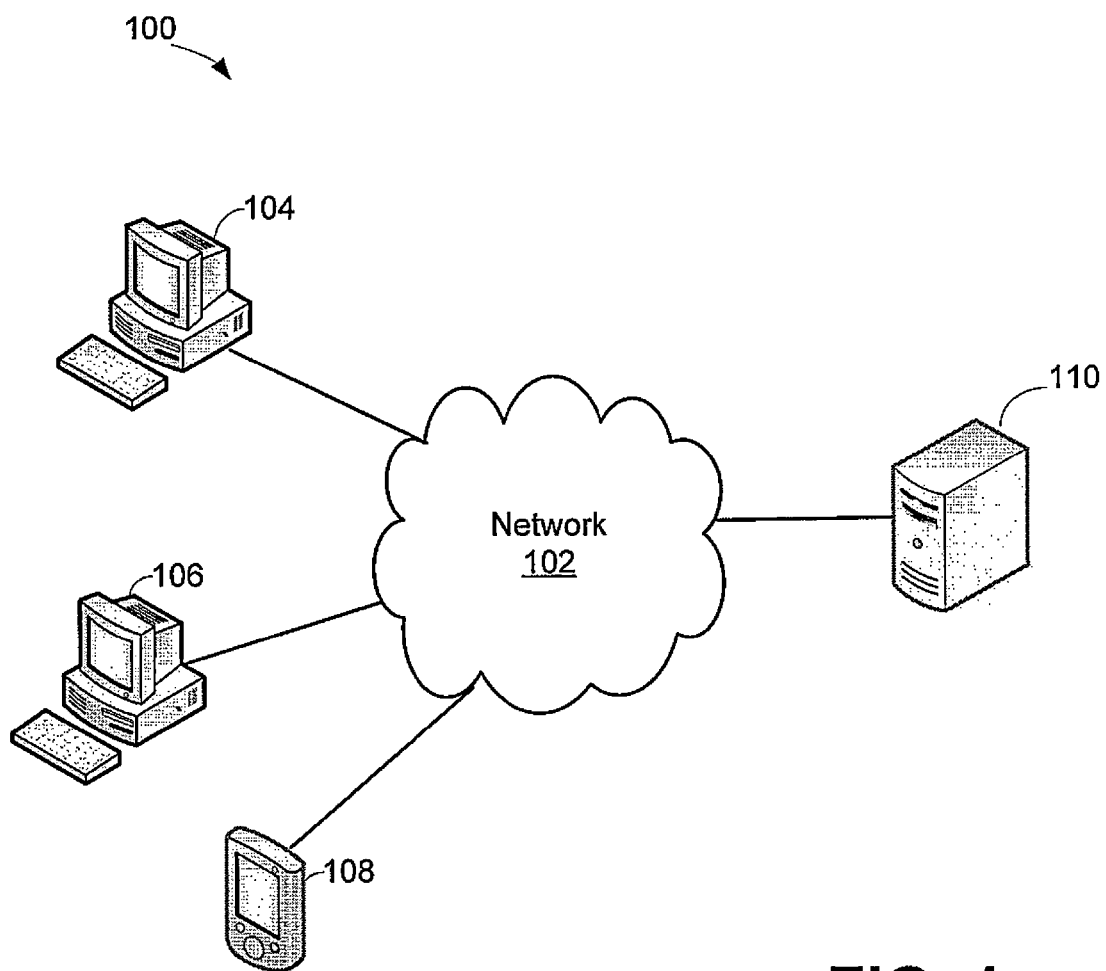
FIG. 1 is a sketch of a network environment in which some embodiments of the invention may be implemented.

Increasing power efficiency of a computing device connected to a network, particularly when it operates using a battery as a power source, may improve the overall user experience. Applicants have recognized and appreciated that new techniques for processing packets received by a computing device may improve the device's power efficiency. In particular, to reduce processor loading, a packet received over the network may be first processed in a network interface. The network interface may determine which of the received packets are of immediate interest to the computing device and which may be deemed as "noisy." Different actions to take with respect to the packet may be selected based on whether the packet is considered "noisy" or "interesting."

Processing the packets within circuitry of a network interface card (NIC), which is used as an example of a network interface herein, separate from a processor of the computing device, may alleviate the processing burden on the computing device, thus increasing the power efficiency of the computing device. The processor may perform other work instead of processing packets that may not even be directed to the computing device, which may increase the efficiency of operation of the computing device and/or reduce power usage. Also, when the computing device is in a sleep mode when a "noisy" packet arrives, the processing of the packet in the NIC may avoid unnecessary waking up of the device. Thus, a length of idle intervals in operation of the computing device may be increased, which reduces power usage.

The network interface, such as, for example, a NIC in the computing device, processing circuitry of a network gateway device or other network interface component, may be configured to determine which network traffic is of interest to the computing device and which traffic would currently be deemed as "noisy" by the device. The traffic determined to be of interest to the operating system or other components of the computing device may be indicated to the operating system immediately.

The "noisy" traffic may comprise packets that include information not specifically targeted for the computing device. For example, when a computer connected to a network is searching for another device on the network, the computer may send to multiple devices on the network a broadcast or a multicast message including a descriptor of another device for which it is searching. Thus, to all receiving devices except the intended recipient of the message such message will be deemed as "noisy." Thus, if a computing device receives a "noisy" packet not intended for this device, such packet may be dropped.

An example of "noisy" network traffic may be a packet generated in accordance with a Link Local Multicast Name Resolution (LLMNR) protocol. Such packet may be used to determine whether a device having a certain name is present on a network (e.g., IPv6, IPv4 or any other suitable network).

Each computing device that receives this message may determine whether the name matches its own network name and discard the message if no match is determined. The network interface of a computing device programmed in accordance with some embodiments may perform the matching and filter out such "noisy" message if it is not destined for the computing device.

Further, some of the "noisy" traffic may not need to be indicated to the operating system immediately, but may nevertheless be indicated to the operating system at a later time when it can be processed more efficiently. Such traffic may therefore be delayed on the NIC, which can indicate the packet to the operating system with a timing that is likely to increase the overall power efficiency of the computing device.

The NIC may be configured to selectively process each incoming packet to determine whether the packet is "noisy" and can be dropped, or whether the packet is of immediate interest to the computing device or whether the packet is of interest, but need not be processed immediately. In some embodiments, the NIC may perform the selective processing of incoming packets in hardware using the techniques described herein. Though, embodiments are not limited with respect to a specific way to implement the selective packet processing, and this hardware may be in a NIC or other network interface. For example, the processing may be performed via a gateway device or other network interface, and it should be appreciated that a NIC is being used as an example of a network interface. Moreover, the selective processing of incoming packets may be performed with more than one network interface connecting the computing device to one or more networks, with each of these network interfaces selectively processing the packets it receives.

The NIC may be programmed to determine that a packet is classified as of immediate interest to the computing device, in which case the NIC may indicate the packet to the operating system immediately, without introducing intentional delay. The NIC may make this determination based on criteria programmed into it specifying packets of immediate interest. Alternatively or additionally, the NIC may indicate the packet to the operating system immediately as a result of a determination that the packet is to neither be delayed nor dropped. If the packet is determined to be "noisy," the NIC may discard it, without alerting the main processing circuitry of the packet's receipt. This alone may improve power efficiency of the computing device by offloading processing of "noisy" packets from the main processing circuitry to the NIC.

Alternatively, the NIC may store some packets that are classified to be provided to the operating system after some delay. The packet may be delayed in the NIC and later indicated to the operating system in a manner that likely improves power efficiency of the computing device. As an example, the NIC may store packets to collect multiple packets such that it can indicate packets to the operating system in groups, which requires generating only a single interrupt to the main processing circuitry of the computing device. Thus, the selective processing of the received packets in accordance with the techniques described herein may decrease a number of interrupts issued to the processor. Because there is overhead associated with processing each interrupt, power efficiency of the computer system may be improved by storing packets until they can be indicated to the operating system in a sufficiently large group. Increased power efficiency may be particularly desirable when the processor is operating using a battery as a power source.

In some embodiments, an operating system of the computing device may specify filter criteria to be utilized by the NIC to determine how to process incoming packets. For this purpose, the operating system may gather information from one or more suitable components of the computing device and/or the NIC and use the information to identify what type and/or under which conditions to classify network traffic as "noisy" packets to be dropped, packets to be stored and/or packets to be indicated immediately. The information may then be used to specify sets of filter criteria.

The operating system may determine the filter criteria using any suitable information, including but not limited to a type of the network, firewall rules, a location of the computing device and other suitable information. For example, the network to which the NIC is connected may be a public, home or work network. Different policies for processing packets may be applicable for these different network types and, by determining a type of a network to which the computing device is connected, the operating system may specify different criteria for filters programmed to recognize different categories of packets. Different network protocols may be used depending on the type of the network, and, consequently, different types of traffic will be deemed as "noisy" depending on the network protocol in use. Accordingly, determining the type of protocol may indicate other criteria to apply to categorizing received packets. Information about applications executing on the computing device alternatively or additionally may be used to set criteria that categorize packets.

In some embodiments, the computing device may be connected to one or more networks via more than one NIC. In such scenarios, each of the multiple NICs may perform processing of incoming packets in accordance with the techniques described herein.

As another source of information to be used in setting criteria, the computing device may have a firewall that is programmed with rules specifying which incoming packets are allowed to reach the computing device and which packets are to be blocked. The operating system may utilize firewall rules to generate criteria for dynamically determining, in the NIC, whether to discard an incoming packet or take other appropriate action with respect to the packet.

Regardless of how the criteria are determined, the sets of filter criteria may be provided from the operating system to the NIC so that the NIC may be programmed to apply the filter criteria to incoming packets. The sets may be provided from the operating system to the NIC via an interface used for communications between the operating system and the NIC. The interface may be hard-coded in hardware of the NIC. Though, in some embodiments, the interface may be located in a driver for the NIC or in any other suitable location.

When programmed to apply the sets of filter criteria to incoming packets, the NIC may apply the filter criteria to incoming packets to determine an appropriate action to take with respect to each packet. One or more filter criteria may be matched with parameters associated with the packet. The parameters may include one or more headers included in the packet. In some embodiments, the packet headers may be processed in a specified order.

One or more sets of filter criteria for one or more filters may be used to determine that a packet may need to be passed to the operating system, but there is no requirement that the packet be indicated to the operating system immediately. The NIC may delay packets passing those filters by storing them for indication to the operating system at a later time. The NIC may store the delayed packets in one or more queues, identified in accordance with parameters specified by the operating system. Each queue may be associated with one or more filters that may apply their criteria to an incoming packet to identify whether a packet may be delayed in the queue.

The queues may be located on the NIC, on a router or in one or more of any other suitable locations. Furthermore, in embodiments where more than one network interface—such as one or more NICs, processing circuitry in one or more routers or other suitable network component(s)—perform packet filtering as described herein, some or all of these network interfaces may delay packets in queues stored in one or more storage locations that are shared among the network interfaces. For example, one of the network interfaces may store all of the queues. Also, one or more of the queues may be stored in location(s) external to any of the network interfaces connecting the computing device to one or more networks. Though, it should be appreciated that other implementations may be substituted, as embodiments of the invention are not limited to a particular location for queues storing delayed packets.

Characteristics of the queues, in some embodiments, may also be programmed through an interface to the NIC. Each queue may be characterized by a time limit, indicating a maximum storage time for a packet in the queue. The NIC may implement a timer for each queue that is used to monitor a status of the queue. The timer may be initiated when a first packet is stored in the queue. When the time limit of the queue is reached, packets stored in the queue may be indicated to the operating system all at once. Thus, a single interrupt to the main processing circuitry may be generated for the indication of multiple packets.

To decrease the number of interrupts issued to the main processing circuitry of the computing device, when an interrupt is generated upon expiration of the time limit of a queue, this interrupt may be used to simultaneously indicate to the operating system all packets currently stored in one or more other queues maintained on the NIC. Thus, a single interrupt may be generated instead of multiple interrupts that would have otherwise been required. This may improve power efficiency of the computing device.

It should be appreciated that any suitable trigger may cause processing circuitry on the NIC to indicate packets from the queues to the main processing circuitry of the computing device. In addition to indicating all packets stored in one or more queues on the NIC when a time limit of one of the queues is reached, the one or more queues may also be emptied and all packets stored in them may be indicated to the operating system when the main processor is interrupted for any other suitable reason. For example, the interrupt may be generated when a packet of immediate interest to the computing device is indicated to the operating system, a queue becomes full, or when any other suitable condition is met. Also, an interrupt may be generated based on a power state of a processor of the main processing circuitry. For example, when it is detected that the processor was previously operating in a low power state (or sleep mode) but has woken up for other reasons, packets may be indicated to the processor. Though, it should be appreciated that embodiments of the invention are not limited with respect to a reason that may trigger an interrupt to the main processor.

FIG. 1 illustrates a network environment in which some embodiments of the invention may be employed. Networked computing devices 104, 106, 108 and 110 are shown connected to a network 102. In the example of FIG. 1, four networked computing devices are shown. However, a network may interconnect any number of computing devices of any types as embodiments of the invention are not limited in this respect. Furthermore, embodiments of the invention may be employed in a networked computing device regardless of network type, size or configuration.

Network 102 may be any network through which networked computing devices may communicate. Each of the networked computing devices may connect to network 102 through a network interface. The network interface allows the networked computing devices to receive packets transmitted over network 102. Hardware components within the network interface may process incoming packets and determine an action with respect to each packet. For example, those actions may include dropping the packet entirely, responding to the packet by the network interface, immediately indicating the packet to the operating system or buffering the packet for later indication to the operating system. Which action is selected for each packet may be based on programming of the network interface that specifies criteria of packets to be assigned to each category.

Figure 2:
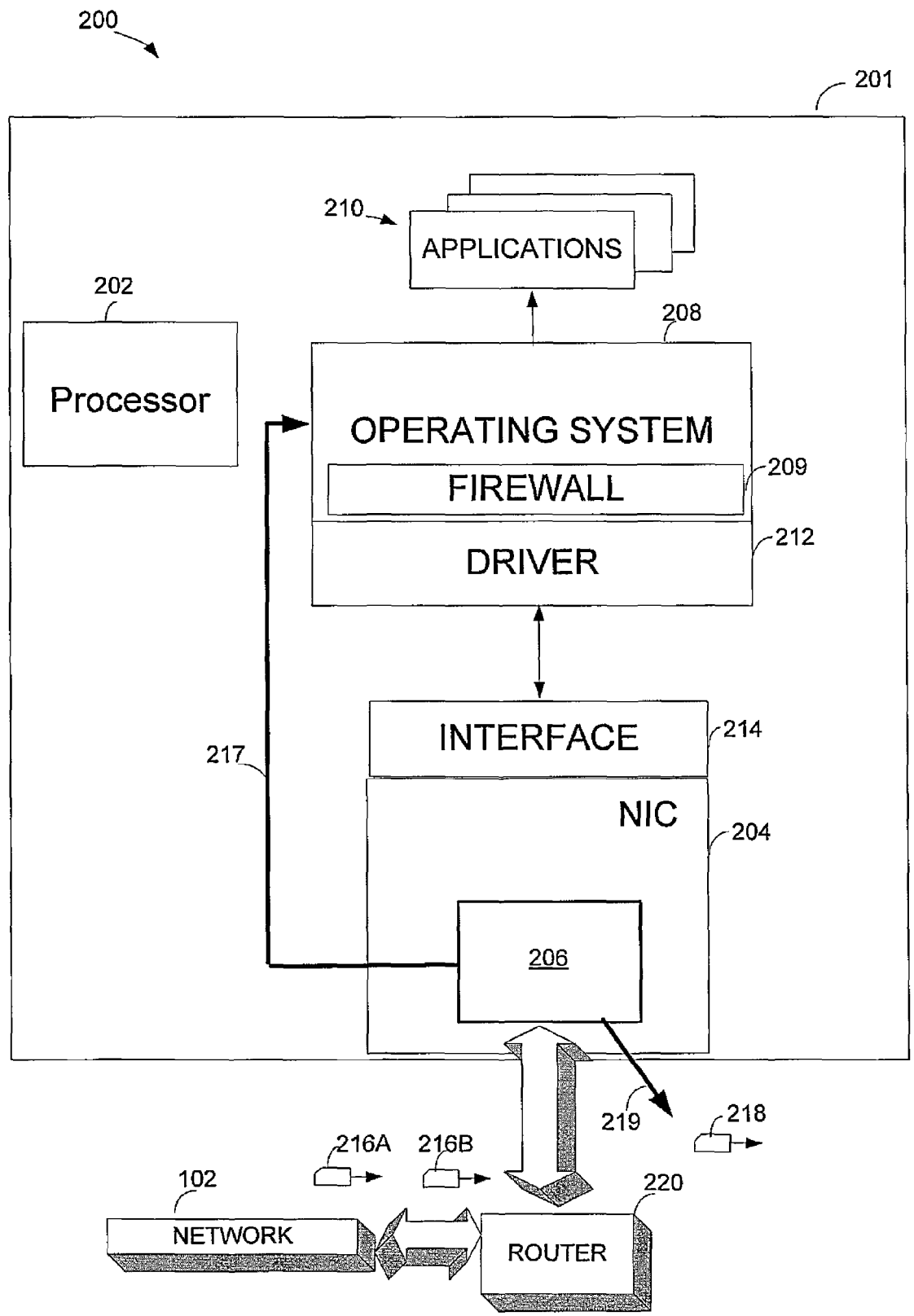
FIG. 2 is a structural block diagram of a computer system in according to some embodiments of the invention.

FIG. 2 shows a structural block diagram of a computer system 200 in which some embodiments of the invention may be implemented. Computer system 200 may comprise any suitable computing device 201, such as, for example, any of computing devices 104-110 or other suitable networked device(s). Computer system 200 may comprise other components not expressly shown in FIG. 2. For example, computing device 201 may include one or more user interfaces, memory, removable tangible computer-readable storage and any other suitable components as embodiments of the invention are not limited in this respect.

As shown in FIG. 2, computing device 201 may include one or more processors. In this example, a processor 202 represents main processing circuitry of computer system 200, which may include one or more processing units and other suitable components that are distinguished from a processor of a network interface. Computing device 201 also includes one or more network interfaces. In this example, one such network interface is shown as a physical network interface card (NIC) 204. NIC 204 connects computing device 201 to a network, such as network 102.

A suitable component of NIC 204, such as a packet filtering component 206, may process incoming network packets to alleviate the processing burden on processor 202, in accordance with some embodiments of the invention. In some embodiments, packet filtering component 206 may be a hardware component, such as one or more application-specific integrated circuits (ASICs), one or more processors separate from the main processor of the computing device, one or more field programmable gate arrays, or other hardware components that may be implemented in any other suitable fashion. Though, embodiments of the invention are not limited to a specific way of implementing the packet filtering outside main processor 202.

As shown in FIG. 2, computing device 201 may include operating system 208. Operating system 208 may perform many different types of functions that are needed for execution of applications such as applications 210. Included among the functions provided by operating system 208 is configuring NIC 204 to send and receive packets over network 102. When packets are received, operating system 208 processes those packets when indicated by NIC 204 and supplies the data from those packets to an appropriate one of the applications 210 or other destination component(s). Operating system 208 may perform any suitable functions, as embodiments of the invention are not limited to any specific functions performed by operating system 208.

Computing device 201 may also comprise one or more drivers that control components outside of operating system 208. FIG. 2 shows by way of example a driver 212 that controls a network interface such as physical NIC 204. Though not expressly shown, computing device 201 may contain additional drivers to control other components within or otherwise associated with the device.

Operating system 208 and NIC 204 may communicate via an interface 214. Interface 214 may be provided by driver 212, located in NIC 204 or otherwise located in computing device 201. Operating system 208 may program NIC 204 via interface 214. This programming may include specifying criteria by which NIC 204 can categorize received packets and an appropriate action for each such category. In the illustrated embodiment, the criteria may be specified as filter criteria that may be applied on NIC 204 to received packets. It should be appreciated that embodiments are not limited to the specific mechanism by which NIC 204 is programmed.

Operating system 208 may specify sets of filter criteria to be used to process incoming network packets schematically shown in FIG. 2 as packets 216A and 216B. It should be appreciated that any suitable types of packets may be processed. To specify the sets of filter criteria, operating system 208 may gather information from NIC 204 and from suitable software or hardware component(s) in computing device 201. The information may include multiple conditions, such as a type of a network to which computer system 201 is connected, firewall rules and other information. The gathered information may also include information about applications or other components executing on computer 201 and the types of packets that are directed to them.

As shown in FIG. 2, operating system 208 may include firewall 209 that allows or blocks communications to and from network 102 based on a set of rules. These rules may be specified by a user of computer 201, an administrator of a network to which computer 201 is connected, by an anti-malware tool vendor or any suitable source. Operating system 208 may obtain from firewall 209 rules that may be used to dynamically discard undesirable network traffic. These rules may then be used in specifying one or more filter criteria in the sets of filter criteria to be provided to NIC 204. It should be appreciated that firewall 209 is shown to be within operating system 208 by way of example only as embodiments of the invention are not limited in this respect. Firewall 209 may be deployed on a network interface, such as NIC 204, router 220 or any other component(s) or device.

Firewall rules are an example of a type of information that may be collected by operating system 208 to identify packets that do not need to be processed by processor 202. Operating system 208 may collect other types of information from other sources and use it to program NIC 204 to discard, or at least delay, those packets as a way to enable processor 202 to operate more efficiently.

Regardless of how the filter criteria are determined, operating system 208 may provide the sets of filter criteria to NIC 204 via interface 214. As a result, NIC 204 may be programmed to apply these sets to incoming packets. When packets, such as packets 216A and 216B are received by NIC 204, packet filtering component 206 may process the packets. The processing may involve applying one or more sets of filter criteria to each incoming packet until it is determined that either criteria of one or more of the filters match parameters of the packet or that no matching filter is identified. If a matching filter is identified, an action to take with respect to the packet may be identified as specified in connection with the matching filter. The action may comprise indicating the packet up to operating system 208 immediately, as schematically shown by an arrow 217. The action may also comprise discarding the packet when the packet is deemed "noisy" by computing device 201, as schematically shown by a discarded packet 218 and an arrow 219. Further, the action may be delaying the packet on NIC 204. If no matching filter is identified, any suitable action may be taken by default. In this example, the default action is that the packet is indicated to operating system 208 immediately.

In addition, in some scenarios, NIC 204 may respond to the packet. For example, for some low level packets, which require a predetermined response in accordance with a network protocol, the NIC 204 may respond rather than indicate the packet to the operating system for processing. NIC 204 may respond to these packets using techniques as are known in the art. Such responses may be identified prior to the filtering described herein or may be identified either before or after that filtering. In some embodiments, NIC 204 may identify as a result of the filtering, that an incoming packet is a packet to which a response can be generated on the NIC. In the embodiment illustrated herein, the packets for which NIC 204 generates a response are processed by NIC 204 prior to the filtering described herein, and such responses are not expressly shown.

FIG. 2 illustrates that computing device 201 may be connected to network 102 via a gateway or other network access device, such as a router 220. In some embodiments, packet filtering component 206 or other component(s) adapted to process network packets in accordance with the techniques described herein may be implemented within such a network access device, such as router 220.

In some embodiments, a network interface, such as, for example, NIC 204, router 220 or other suitable device, may first receive and process incoming packets by applying the filters to the packets. Each filter may be associated with an action that specifies an action to perform on the packet. Sets of filter criteria for the filters may be specified by operating system 208 in a manner that allows increasing power efficiency of processor 202.

Figure 3A:
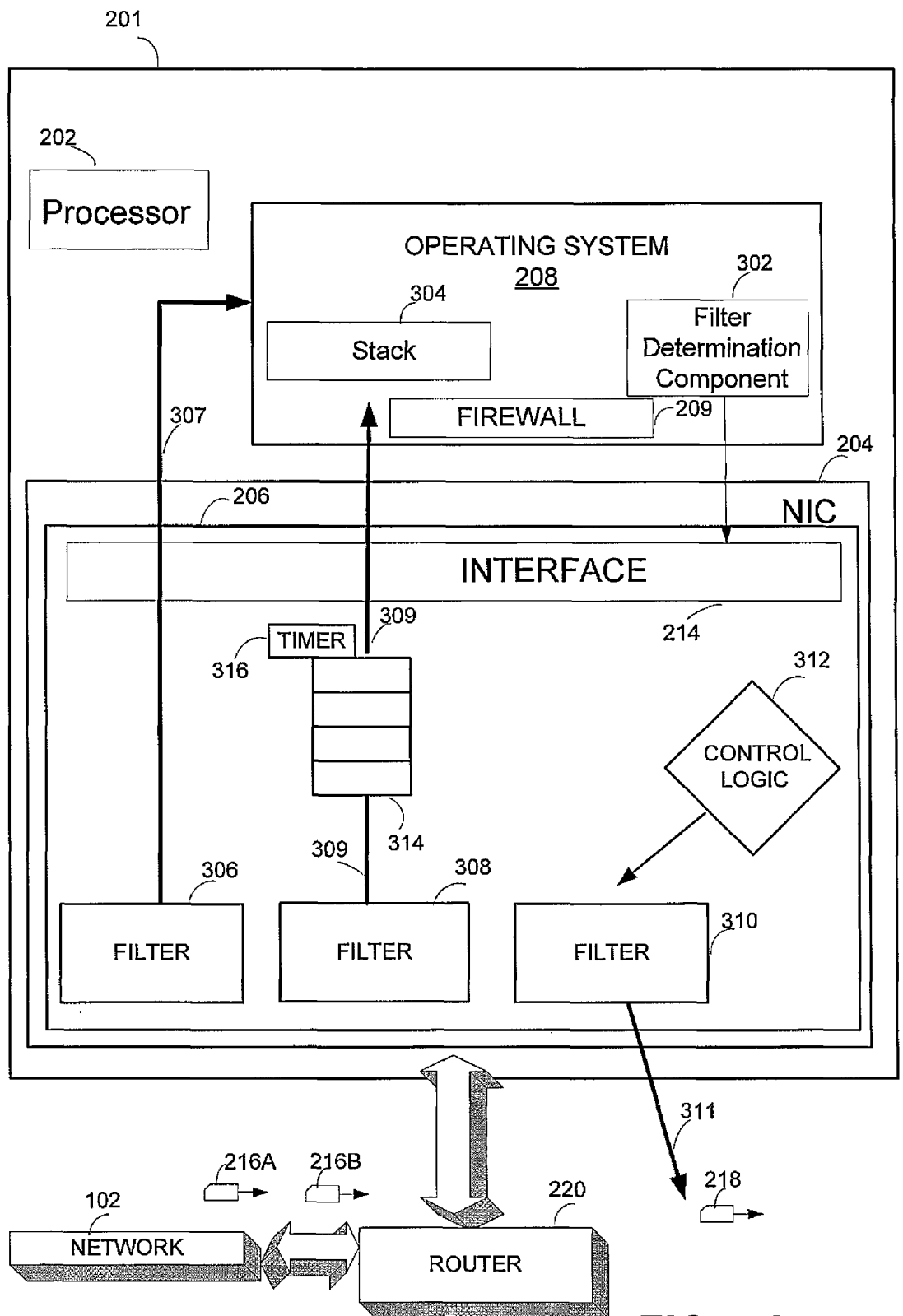
FIG. 3A is a functional block diagram of a computer system in which a network interface card (NIC) performs packet filtering according to some embodiments of the invention.

FIG. 3A illustrates in more detail computing device 201 connected to a network, such as network 102, via NIC 204. In operation, NIC 204 may receive packets (e.g., packets 216A and 216B) over network 102 and process those packets. Packets may be processed within NIC 204 to decrease load on processor 202. Specifically, NIC 204 may alert processor 202 of incoming packets less frequently such that a number of interrupts may be decreased. As a result, processing overhead associated with each interrupt is reduced. Further, if computing device 201 is operating in a low power state, the duration of idle intervals in which the processor may be placed in or remain in a low power state may be increased, which in turn saves power.

FIG. 3A shows that operating system 208 comprises a filter determination component 302 that specifies sets of filter criteria used to process incoming packets in NIC 204. In the embodiment illustrated, the filter criteria are used to classify packets into one of at least three categories: "noisy" packets, which are discarded, packets of immediate interest and packets of interest, but that can be delayed before processing. Filter determination component 302 may specify the sets of filter criteria based on any suitable information, including network conditions. Those conditions may include the type of network to which a network interface, such as NIC 204, that received the packet is connected, such as home, enterprise or public place. Those conditions may also include the type of protocol in use. Accordingly, depending on the network conditions, a definition of a "noisy" packet for computing device 201 may vary. For example, different types of packets may be considered "noisy" or "interesting" to computing device 201 based on whether NIC 204 is connected to a home, work or a public network.

Conditions which may be used to determine what traffic is deemed "noisy" may be a type of the network, a network protocol used and any other suitable conditions. For example, filter criteria may be specified to determine whether an incoming packet was generated in accordance with a Link Local Multicast Name Resolution (LLMNR) protocol. Such a packet may be used to determine whether a device having a certain name is present on a network (e.g., IPv6 network). Each computing device that receives this packet may determine whether the name matches its own network name and discard the packet if no match is determined. Thus, NIC 204 may apply to the received packet the filter criteria specific to the LLMNR protocol to determine whether the packet was generated in accordance with this protocol and, if this is the case, whether the packet is destined for computing device 201. If the received packet is generated in accordance with the LLMNR protocol, it may be deemed as "noisy" if the packet is not targeted for computing device 201. However, when computing device 201 is a destination for the LLMNR packet, such packet may be indicated to operating system 208.

As another example of filter criteria, operating system may gather information from firewall 209 for specifying filter criteria used to drop undesired network traffic. Any other suitable information may be gathered by operating system 208 to specify sets of filter criteria.

As shown in FIG. 3A, operating system 208 comprises a stack 304 which is communication software containing multiple components, each for processing packets in accordance with a protocol layer of multiple protocol layers. Processing within the stack may format data for transmission over the network. For received packets, processing may involve identifying the intended destination of data received over the network. Stack 304 may be implemented using techniques as are known in the art and may process packets, either singly or in groups, when NIC 204 indicates that packets have been received and are ready for processing by operating system 208.

Operating system 208 may provide, via interface 214, to NIC 204 the sets of filter criteria specified by filter determination component 302. In some embodiments, hardware of NIC 204, such as packet filtering component 206 or other hardware component, may be programmed to apply the sets of filter criteria to first receive and process incoming packets. Packet filtering component 206 may be implemented using one or more ASICs, one or more field programmable gate arrays, or other hardware components that may be implemented in any suitable manner. The filter criteria programmed in packet filtering component 206 are shown in FIG. 3A by way of example as filters 306, 308 and 310. Though, NIC 204 may be programmed in any suitable way. Regardless of the way in which NIC 204 is programmed to perform packet processing, NIC 204 may receive and process incoming packets to categorize received packets and, based on the category into which each packet is assigned, select an action to be performed on that packet.

Operation of filters 306, 308 and 310 may be controlled by a control logic component 312. Control logic 312 may receive the filter criteria through interface 214 and configure filters 306, 308 and 310 based on the criteria such that those criteria will be applied to incoming packets. Additionally, control logic 312 may control the transfer of packets to one or more queues if it is determined that the applicable action for a received packet is to store it in the queue. Functions performed by control logic 312 may be controlled by commands from operating system 208 passed through interface 214.

Control logic 312 may be implemented using a portion of a semiconductor chip. In some embodiments, that semiconductor chip may be field programmable, allowing the specific functions performed by NIC 204 to be changed as computing device 201 operates, or at any other suitable time. Further, the functions performed by control logic 312 may be controlled or implemented in whole or in part by driver 212 (FIG. 2) for NIC 204 or other software within computing device 201. Accordingly, control logic 312 may be implemented in any suitable manner.

Filters 306, 308 and 310 may include filter criteria implementing processing logic specified by operating system 208. By programming NIC 204 to apply the filter criteria, the processing burden associated with filtering of incoming packets may be offloaded from processor 202 to NIC 204. NIC 204 may filter incoming packets using only the processing logic that was provided by operating system 208, without itself being aware of the manner in which operating system 208 determined the filter criteria to define "noisy" and "interesting" packets.

Each received network packet (e.g., packets 216A and 216B) may be processed by NIC 204. The processing may involve applying filters 306, 308 and 310 to the packet to determine an action to take with respect to the packet. Furthermore, in some embodiments, NIC 204 or any other network component connecting computing device 201 to a network may itself respond to a received packet. In such embodiments, NIC 204 may further include one or more suitable filters to determine a manner to respond to the packet via NIC 204.

Each filter may include a set of criteria that may be matched with parameters associated with the packet.

In this example, each filter is configured to pass packets associated with a particular category of packets as defined by the operating system. In this example, the outputs of the filters may be mutually exclusive such that each packet passes through only one filter. Though, it should be appreciated that filters may be configured to operate in other ways, such as block packets that do not fall into a certain category. Moreover, it is not a requirement that there be a one-to-one relationship between filters and categories of actions. In some embodiments, multiple filters, and connections among those filters, may be specified to define how packets can be identified for selective processing.

The filters may operate on any suitable portion of the packet. In some embodiments, packets headers may be processed by being matched with the set of filter criteria. For example, each header may be matched with corresponding one or more filter criteria. For example, a specific field in a packet header may specify a network protocol used to transmit the packet. This field may be matched against criteria of a filter to determine whether the filter operates for this protocol. Other fields of the header or other headers may be matched against other filter criteria. When a suitable number of headers of the incoming packet are inspected by the NIC, an action to take on the packet may be determined.

In some embodiments, packet processing in the NIC involves inspecting headers of the received packet in a particular order. Thus, the headers may be processed starting from the outermost header and following with other subsequent header(s), without skipping any intermediate headers. Such successive processing of packet headers may be used to increase efficiency of the manner in which the filters are applied to a packet. This approach may be particularly efficient in embodiments in which the filters may be specified and passed to the network interface. A network interface, even one with relatively simple processing capabilities, may perform packet processing, while more complex processing can nonetheless be carried out to identify which packets to drop. This more complex processing, for example, may be performed within the operating system.

Though, it should be appreciated that the filtering of packets need not be limited to comparisons made on packet headers. In some cases, for example, the filter criteria may specify a condition of on either the value or size of a packet payload or other packet characteristics, such as time of arrival.

Specifying sets of filter criteria by the operating system may reduce a number of filters that otherwise would need to be implemented in the NIC. The operating system may dynamically specify, using possibly complex processing, how packets are to be filtered at any given time. Moreover, specifying that some packets are delayed, rather than dropped, can reduce the need to precisely identify in advance packets to be dropped, while still obtaining processing efficiencies. Because the NIC only implements the filters while the filter criteria are supplied by the operating system, incoming packets may be processed efficiently, without employing substantial circuitry of the NIC.

The filters may be used to determine an action to take with respect to the packet. In the example of FIG. 3A, when parameters of the received packet match filter 306, the action may be to indicate the packet to stack 304 immediately, as shown by an arrow 307. Filter 306 may thus be used to filter out packets that are of immediate interest to operating system 208. Stack 304 may make the packet available to its intended destination (e.g., one or more of applications 210 in FIG. 2).

When the received packet matches filter 308, the action may be to delay this packet on NIC 204, as shown by an arrow 309. Specifically, the packet may be transferred to a queue 314 maintained on NIC 204. Queue 314 may be implemented as any suitable storage medium on the NIC that may store packets. A packet may be delayed in one or more queues when that packet is deemed as of interest, albeit not immediate one, to operating system 208. Thus, such a packet may be stored in NIC 204 and indicated to operating system 208 at a later time, which may be selected in a way that reduces power consumption by processor 202. For example, a queued packet may be indicated when processor 202 is interrupted for any suitable reason. Alternatively, when the received packet matches filter 310, the action may be to discard the packet (e.g., packet 218), as shown by an arrow 311. In scenarios where the packet does not match any of filters 306, 308, 310 and any other filters, a default action may be taken. In this example, the default action may be for the packet to be indicated to operating system 208 upon its receipt. In scenarios in which immediate indication of a packet is the default action, it should be appreciated that filter 306 need not be an actual component, because filter 306 will pass any packet not diverted for other processing as a result of matching filter 308 or 310.

When a received packet matches filter 308 and is therefore categorized as being of interest, but not immediate interest, the packet may nevertheless need to be indicated to operating system 208, albeit possibly with delay. Accordingly, such packet may be transferred into queue 314 associated with filter 308. It should be appreciated that only one queue 314 is shown in FIG. 3A by way of example only. Alternatively, packets may be stored on NIC 204 in multiple queues, with different types of queues being associated with different categories of packets. For example, packets may be categorized based on a degree of delay that can be tolerated before indication of the packet to the operating system and separate queues may be provided, each operated to provide a different maximum delay before indicating a packet to the operating system. Also, while queue 314 is shown to be associated with filter 308, a queue may be associated with more than one filter having filter criteria that are used to determine what types of packets to store in that queue. Furthermore, queue 314 is shown to be located within packet filtering component 206 as an example, as queue 314 may be stored in other suitable locations.

As shown in FIG. 3A, queue 314 may be associated with a timer component 316 that may keep track of a status of queue 314. Timer 316, which may be any suitable component, may be initiated when a packet is stored in the queue when the queue is empty. In this example, timer 316 will count down until it is triggered at a time after the first packet is written into queue 314. Like filter criteria for filters 306, 308, and 310, values used for implementing queue 314, such as the size of the queue, and timer 316 on NIC 204 may be specified by operating system 208. Though, it should be appreciated that any or all of these parameters may be specified in other ways, such as being preconfigured on the NIC 204. NIC 204 may implement queue 314 and timer 316 in hardware or in any other suitable manner.

Timer 316 specifies a time limit, representing a maximum duration that any packet will stay in the queue without being indicated to the operating system. When timer 316 determines that the time limit of queue 314 has been reached, queue 314 may be emptied to indicate the packets stored in the queue to operating system 208 all at once.

In some embodiments, the time limit of queue 314 may be set by operating system 208. Operating system 208 may obtain information from one or more suitable components and set the time limit of queue 314 based on this information. For example, operating system 208 may set the time limit of queue 314 based on a maximum delay tolerance that may be allowed by a network protocol used to transmit packets to be stored in the queue and filtered out by a corresponding filter. The maximum delay tolerance for a protocol may indicate a maximum delay time during which a response to a packet is expected by a sending device. If the response (e.g., an acknowledgment or any other information) is not received when the maximum time expires, the sending device may conclude that a receiving device is not available, that there is an error on the network or otherwise react to the lack of the response.

To specify a time limit of a queue, operating system 208 may obtain information on a maximum delay tolerance for a network protocol and adjust the maximum delay tolerance based on suitable criteria, such as a time required by processor 202 to process a packet, power savings considerations and other criteria. The time limit of queue 314 may be set in other suitable ways, as embodiments of the invention are not limited in this respect. Though, it should be appreciated that by setting a longer time limit, power consumption by the computing device may decrease because, during the longer time, there is an increased probability that favorable conditions for transferring the packets in queue 314 may be encountered. Those favorable conditions may include increasing the number of packets in the queue when the transfer occurs or making the transfer at a time when the processor receiving the packets is interrupted for another reason.

Figure 3B:
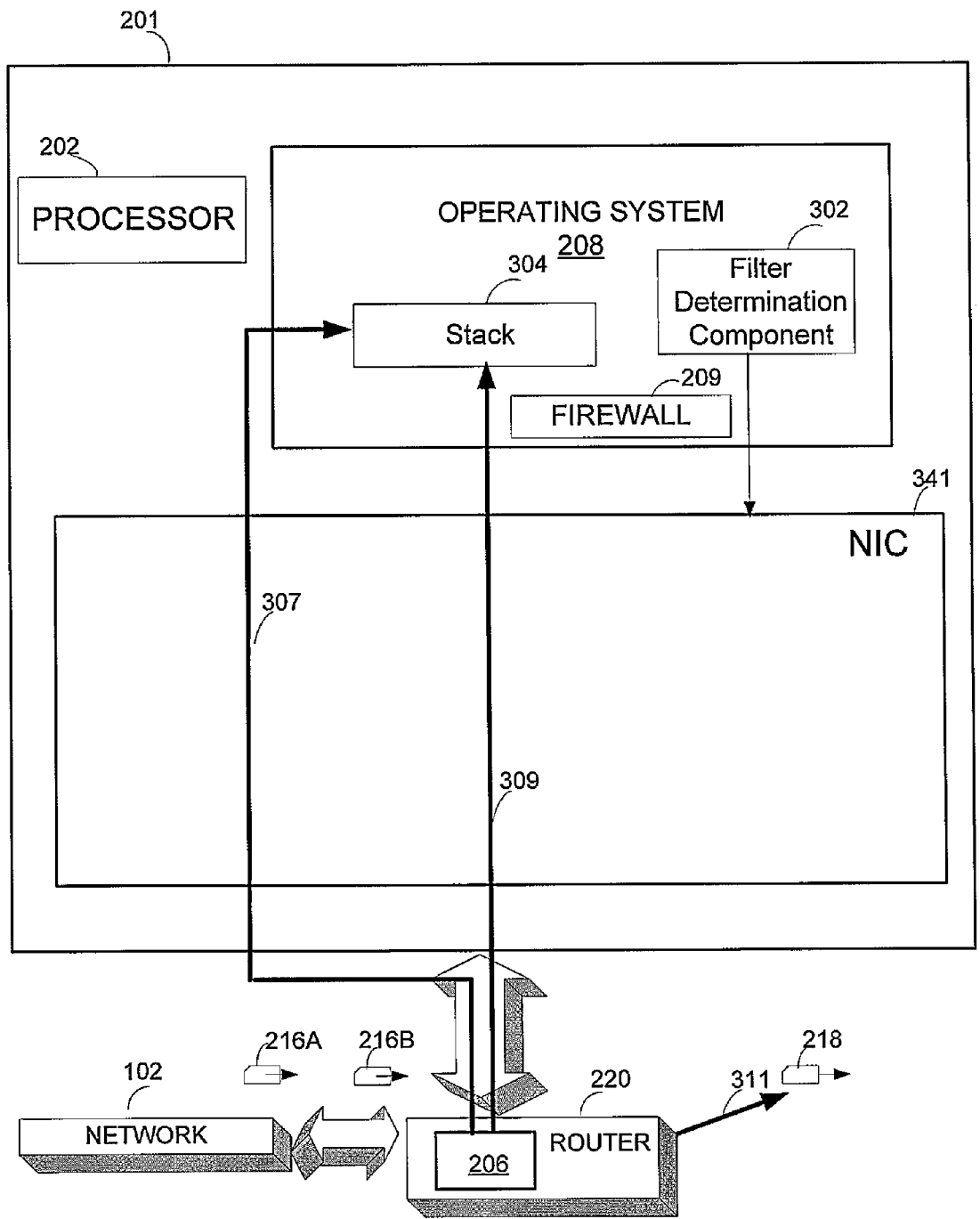
FIG. 3B is a functional block diagram of a computer system in which a network gateway device performs packet filtering according to some embodiments of the invention.

As shown in FIG. 3A, processing of incoming packets in accordance with some embodiments may be implemented in NIC 204. Though, embodiments of the invention are not limited to a specific type of a network interface in which the techniques described herein may be implemented. Accordingly, FIG. 3B illustrates another embodiment where packet filtering component 206 is located on router 220. Packet filtering component 206 may be implemented on router 220 in hardware and may include the same components as those included in packet filtering component 206 located on NIC 204 and described in connection with FIG. 3A. If packet filtering component 206 is located on a remote component, it may nonetheless be programmed by operating system 208 through an interface, though that interface may operate according to a different protocol to account for transmission over a network.

Though, router 220 may include any other suitable components, which may be different from the components included in packet filtering component 206 located on NIC 204, that may be used to filter incoming packets in accordance with the techniques described herein. Router 220 may be configured to use the IEEE 802.11 communication standard to provide wireless communications for computing device 201. Router 220 may be implemented in any suitable manner.

As discussed above, an operating system of a computing device connected to a network via a network interface performing packet filtering in accordance with some embodiments of the invention may specify sets of filter criteria which may then be used to program the network interface. To specify the filter criteria, the operating system may gather information from the network interface, software and hardware components of the computing device and from any other suitable source. The network interface may be configured to apply the sets of filter criteria to incoming packets to determine an action to take with respect to each packet.

Packet filtering circuit 206, even if implemented in a remote component providing a network interface, may similarly selectively take action on received packets, that includes immediate indication to the operating system, delayed indication or discarding a packet. Though, rather than directly interrupt processor 202, packet filtering circuit 206 will supply the filtered packets to a conventional NIC 341, which will interrupt processor 202 when a filtered packet is received. Accordingly, packet filtering circuit 206 may store packets to be delayed and forward them in a block to NIC 341.

Figure 4:
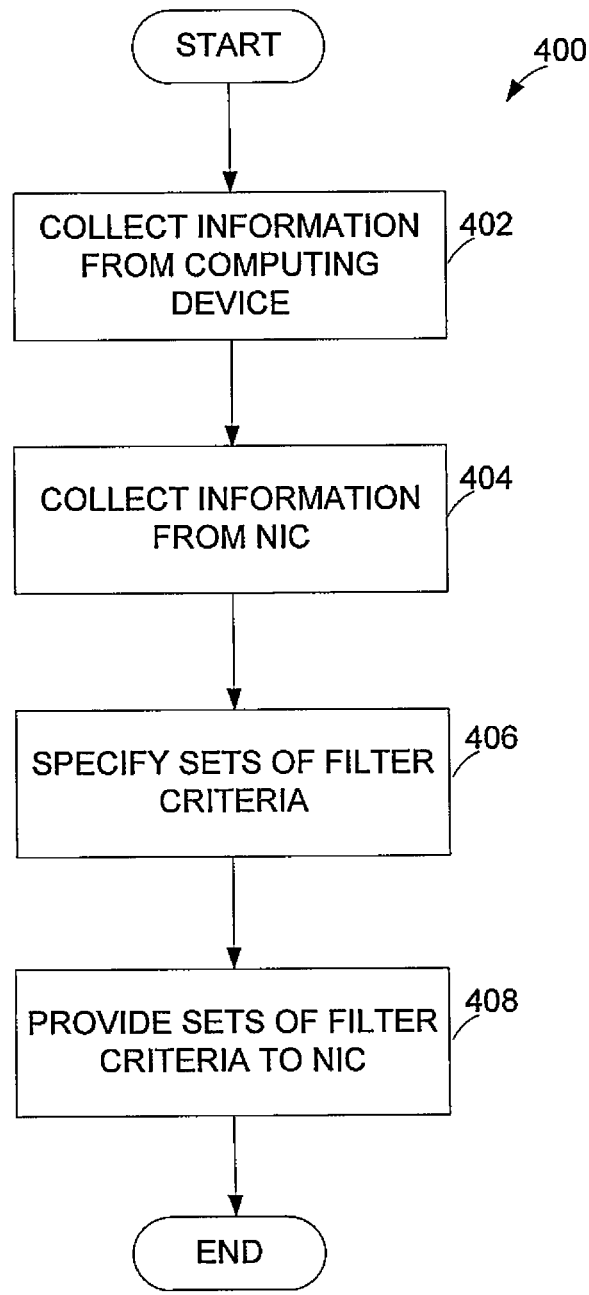
FIG. 4 is a flowchart of a method of specifying sets of filter criteria by an operating system according to some embodiments of the invention.

FIG. 4 illustrates a process 400 of specifying sets of filter criteria by the operating system of a computing device (e.g., operating system 208 of computing device 201). Process 400 may be performed by any suitable component(s) of the operating system, such as, for example, by filter determination component 302 shown in FIGS. 3A and 3B.

It should be appreciated that, in some embodiments, the computing device may connect to one or more networks via more than one NIC. In such embodiments, each of the NICs may perform packet filtering in according with the techniques described herein independently of other NICs. Accordingly, process 400 may be performed for each of the NICs to specify sets filter criteria to be applied by the respective NIC to packets received by that NIC.

At block 402, the operating system may collect information from the computing device that may be used to determine what type and/or under which conditions to classify network traffic as "noisy." Any other suitable information may be collected. For example, the collected information may comprise a type of the network (e.g., a home, public or work network) on which the computing device may operate. Different types of network traffic may be deemed as "noisy" depending on a type of the network. The operating system may select network protocols for each type of the network and specify whether incoming packets sent in accordance with a network protocol may be treated as "noisy." An example of "noisy" network traffic may be a packet generated in accordance with a Link Local Multicast Name Resolution (LLMNR) protocol used to resolve names of other computers on the network. The LLMNR protocol may be used on a home network, where, when a received LLMNR packet is not destined to the computing device, the packet may be deemed as "noisy." The LLMNR protocol may be used on other networks as well.

The information gathered by the operating system to specify sets of filter criteria may also comprise firewall rules. The computing device may have a firewall that includes firewall rules used to determine which incoming packets are allowed to reach the computing device and which packets are to be blocked. The operating system may utilize the firewall rules to generate filter criteria for dynamically determining, in one or more of the NICs, whether to discard an incoming packet. The firewall may be located on the computing device. Though, in some scenarios, the firewall may be deployed on the network interface or on any other suitable component.

The operating system may collect information on processing capabilities of the computing device to specify, as part of filter criteria, criteria for storing packets on the NIC, in one or more queues, and indicating packets to the computing device so that the main processor can handle the packets with less additional power usage. Any other suitable information may be collected by the operating system to specify the sets of filter criteria.

Next, at block 404, the operating system may collect from the NIC information that may be used to specify the sets of filter criteria. For example, the operating system may identify a type of a network to which the computing device is connected or protocol in use by that network. Based on a type of the network, the operating system may determine which filter criteria are to be used to program the NIC for packet filtering.

In embodiments in which the NIC may comprise a firewall, the operating system may gather information from firewall rules of the firewall deployed on the NIC. The operating system may use these rules to specify filter criteria that are then used to program the NIC. It should be appreciated that any suitable information may be gathered by the operating system from the NIC. Also, the operating system may collect information used to specify sets of filter criteria from any other suitable component(s), including applications executing on the computing device. This information may be collected from the components generating the information or may be collected from places where such information is stored. For example, an application may request from a networking component within the operating system a particular quality of service for network traffic, and information about the application may be obtained from that component.

It should be appreciated that collection of information by the operating system from the NIC at block 404 is shown to follow collection of information by the operating system from the computing device by way of example only. The operating system may collect information in accordance with the techniques described herein in any suitable manner.

Regardless of the way in which the operating system collects information to specify sets of filter criteria, next, at block 406, the operating system may specify these sets. Each set of filter criteria may be regarded as defining a filter. Though, the specific implementation of the filter criteria is not critical to the invention. The sets of filter criteria may be specified by the operating system in any suitable manner that allows using the filter criteria to program the NIC. For example, the filter criteria may be specified as software comprising instructions that are used to program the NIC. One or more filter criteria may specify an action to take with respect to an incoming packet when parameters of the packet match the one or more filter criteria.

The filter criteria may comprise values used to delay packets on the NIC. Such values may comprise values used to maintain and manage a queue on the NIC, such as a time limit, maximum size of the queue, and any other suitable values. These values may be specified, for example, based on various network protocol parameters, such as a maximum delay for a response to a packet, and processing capabilities of the computing device. The values may then be passed to the NIC to implement the queues on the NIC, which may be done by programming hardware of the NIC.

Next, at block 408, the sets of filter criteria specified by the operating system may be provided to the NIC so that the NIC may be programmed to process incoming packets using the sets of filter criteria. Accordingly, the NIC may implement packet filtering in accordance with the criteria specified within the operating system.

In some embodiments, hardware of the NIC may be programmed to perform the selective processing of incoming packets using the sets of filter criteria. The operating system may provide the sets of filter criteria to the NIC via an interface, such as interface 214 (FIG. 2). Process 400 may then end. Though, it should be appreciated that process 400 may continuously operate as the operating system collects suitable information, such as information on a network to which the computing device is connected and other information, to determine which network traffic is currently deemed as "noisy." Furthermore, the operating system may update the filter criteria in the NIC over time as network and any other suitable conditions change and/or as additional information is collected by the operating system.

When programmed with the sets of filter criteria specified by the operating system, the NIC may apply the filter criteria to each incoming packet to determine an action to take with respect to the packet. The action may be determined based on a matching filter that may be identified when parameters associated with the packet match one or more sets of filter criteria. The action may be discarding the packet, storing the packet in a queue on the NIC or notifying main processing circuitry of the packet immediately. In some embodiments, immediate indication may be regarded as a default action such that, when no matching filter is identified, the NIC may immediately indicate the packet to the operating system.

In techniques described herein, when an interrupt is generated for main processing circuitry of the computing device for any reason, all packets stored on the NIC may be indicated to the NIC via this interrupt. The reason may include arrival of a packet that is of immediate interest to the operating system and is therefore indicated to the operating system immediately upon its receipt. The packet may also be indicated to the operating system immediately when no match has been identified between the packet and sets of filter criteria applied by the NIC. In some embodiments, when the computing device is operating in a low power state (sleep mode), such packet may be a wake-on-LAN packet of which the computing device may be notified immediately.

When packets are stored in one or more queues on the NIC, expiration of a time limit of any of the queues may be a reason to generate a processor interrupt. Also, an interrupt may be generated when any of the queues becomes full or any other suitable condition is satisfied. The interrupt may also be triggered in response to a power state of the main processing circuitry, such that an interrupt is generated only when the main processing circuitry is operating in a state that it can process the packet without entering a higher power state. For example, packets may be indicated when the processor is otherwise on an awake state.

Regardless of the conditions under which an interrupt to the main processing circuitry is generated, packets aggregated in one or more queues on the NIC may be indicated to the operating system all at once via this interrupt. The use of a single interrupt to indicate multiple packets to the NIC all at once may decrease processing load of the main processing circuitry of the computing device. When the computing device is operating in a low power state, the NIC may receive a packet of which the computing device may not need to be immediately notified. Delaying such packet in the queue instead of notifying the computing device of the packet may increase a length of an idle period during which the computing device may remain in the low power state and also increase the likelihood that the processor will enter a power state in which it can process the packet for other reasons, such that the power state of the processor does not need to change to process packets.

Figure 5:
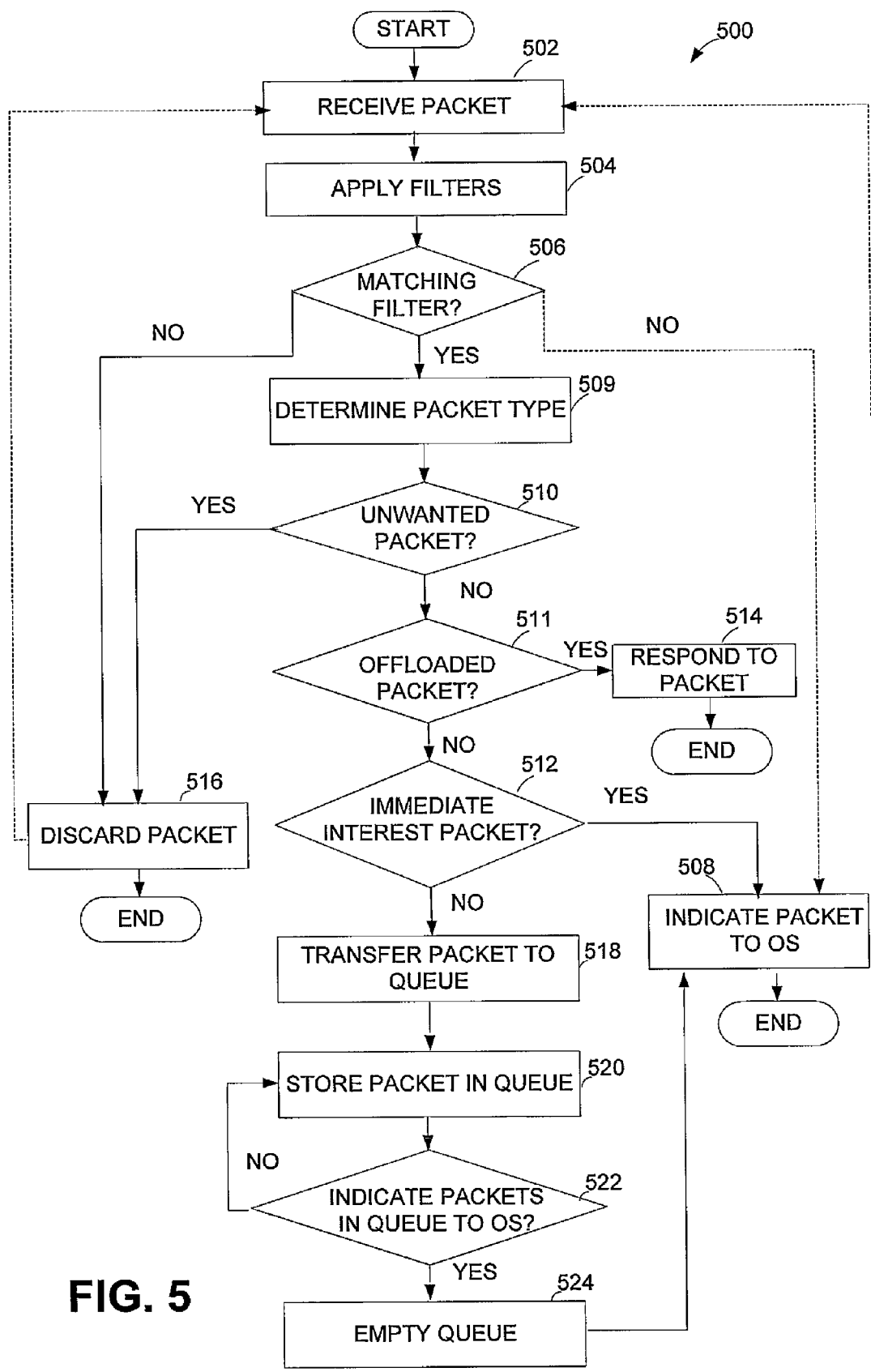
FIG. 5 is a flowchart of a method of operation of a network interface according to some embodiments of the invention.

FIG. 5 shows a process 500 of filtering packets on a network interface, such as a NIC (e.g., NIC 204), processing circuitry in router 200 or other network component, in accordance with some embodiments of the invention. In this example, a NIC connecting a computing device (e.g., computing device 201) to a network will be described as an example of a network interface implementing filtering of packets using the techniques described herein.

Process 500 may start at any suitable time. For example, process 500 may start when operation of the network interface is initiated, via a user input, an instruction from the computing device or in response to any other suitable trigger.

At block 502, a packet may be received via a network, such as network 102, on the NIC. The NIC may receive the packet in accordance with any known or any other suitable mechanism.

Next, at block 504, one or more suitable components on the NIC, such as a packet filtering component (e.g., packet filtering component 206), may apply sets of filter criteria specified by the operating system to the received packet. Processing the packet using the sets of filter criteria may involve matching parameters of the packet with the filter criteria to identify a matching filter.

At decision block 506, it may be determined whether a matching filter is identified. The filter may be taken as "matching" when criteria of the filter match one or more packet parameters so that an action to take on the packet specified via the one or more criteria may be identified.

When it is determined, at block 506, that no matching filter is identified, process 500 may branch to block 516 where the packet may be discarded immediately. Though, any suitable action may be taken when no matching filter is found. For example, in some embodiments, when no matching filter is identified at block 506, process 500 may follow to block 508 where the packet may be indicated to the operating system immediately, as shown schematically by a dashed arrow in FIG. 5.

If processing reaches block 508 because a packet is to be indicated, an interrupt to the processor of the computing device generated for this indication may be used to indicate to the operating system all packets stored on the NIC. Process 500 may then end. Though, it should be appreciated that process 500 may be continuous and may thus return to block 502 to receive another packet via the network, as schematically shown in FIG. 5. One or more suitable components within circuitry of the NIC programmed to process network packets to alleviate processor load may continuously operate to receive and process incoming packets to make decisions regarding the packets.

Returning to processing at decision block 506, when the matching filter is identified, process 500 may follow to block 509, where a type of the packet as identified by the NIC using the filter criteria may be determined. The filter criteria may specify a type of network traffic to be deemed as "noisy" by the computing device.

Accordingly, process 500 may branch at decision block 510 depending on whether the packet is identified as an "unwanted" packet. The packet may be "unwanted" by the computing device for a number of different reasons, such as when the packet is deemed "noisy" by the computing device or for any other suitable reason. If it is determined, at block 510, that the packet is "unwanted," process 500 may follow to block 516 where the packet may be discarded. A received packet may be discarded when the computing device is not the packet's intended destination or under other conditions under which the packet need not be processed in the operating system or applications executing on the computing device.

Alternatively, when it is determined that the packet is not identified as "unwanted," process may branch to decision block 511 where it may be determined whether the packet is an "offloaded" packet. The "offloaded" packet is of a type that may be processed within the NIC so that the NIC itself responds to the packet. Thus, if it is determined, at decision block 511, that the packet is "offloaded" packet, process 500 may follow to block 514 where the NIC may respond to the packet. Processing at block 514 may be performed in any suitable way, such as by circuitry on the NIC hardwired or configured through programming to respond to a particular type of packet. Process 500 may then end. Though, because process 500 may be continuous, the process may return to block 502 to receive another packet via the network, which is not shown for the sake of simplicity.

Conversely, if it is determined, at decision block 511, that the packet is not an "offloaded" packet, process 500 may follow to decision block 512 where it may branch based on whether the packet is of immediate interest to the computing device. If it is determined, at block 512, that the packet is of immediate interest to the computing device, process 500 may continue at block 508 where the packet may be indicated to the computing device immediately. To increase power efficiency of the computing device, when an interrupt is generated to indicate that packet to the operating system, packets aggregated in one or more queues on the NIC or in any other suitable storage may also be indicated to the operating system all at once.

Conversely, if it is determined, at decision block 512, that the packet is not classified as of immediate interest, process 500 may continue at block 518 where the packet may be transferred into a queue of one or more queues. The queue(s) may be created in memory on the NIC or in any other suitable storage either on the NIC or accessible to it. The packet may be stored, at block 520, in the queue until a time when it is indicated to the operating system. The time may be such that it allows handling of the packet by the processor in a manner that reduces processor loading and, in some embodiments, saves battery power.

Accordingly, process 500 may follow to decision block 522 where it may branch depending on whether it is determined that a condition is met signifying that packets aggregated in one or more queues, including the queue that stores the packet, may be indicated to the operating system. The condition may be met when the main processor is interrupted for any suitable reason. If it is determined, at decision block 522, that the condition is met, process 500 may proceed to block 524 where the one or more queues may be emptied and all packets in the queues, including the packet received at block 502, may then be indicated to operating system all at once, at block 508. This simultaneous processing of multiple packets may decrease the processing demands on the main processor of the computing device. Alternatively, if it is determined, at decision block 522, that the condition to indicate packets stored on the NIC to the operating system is not met, process may return to block 520 so that the packet remains to be stored in the queue until it is determined that the packet may be indicated to the operating system.

Figure 6:
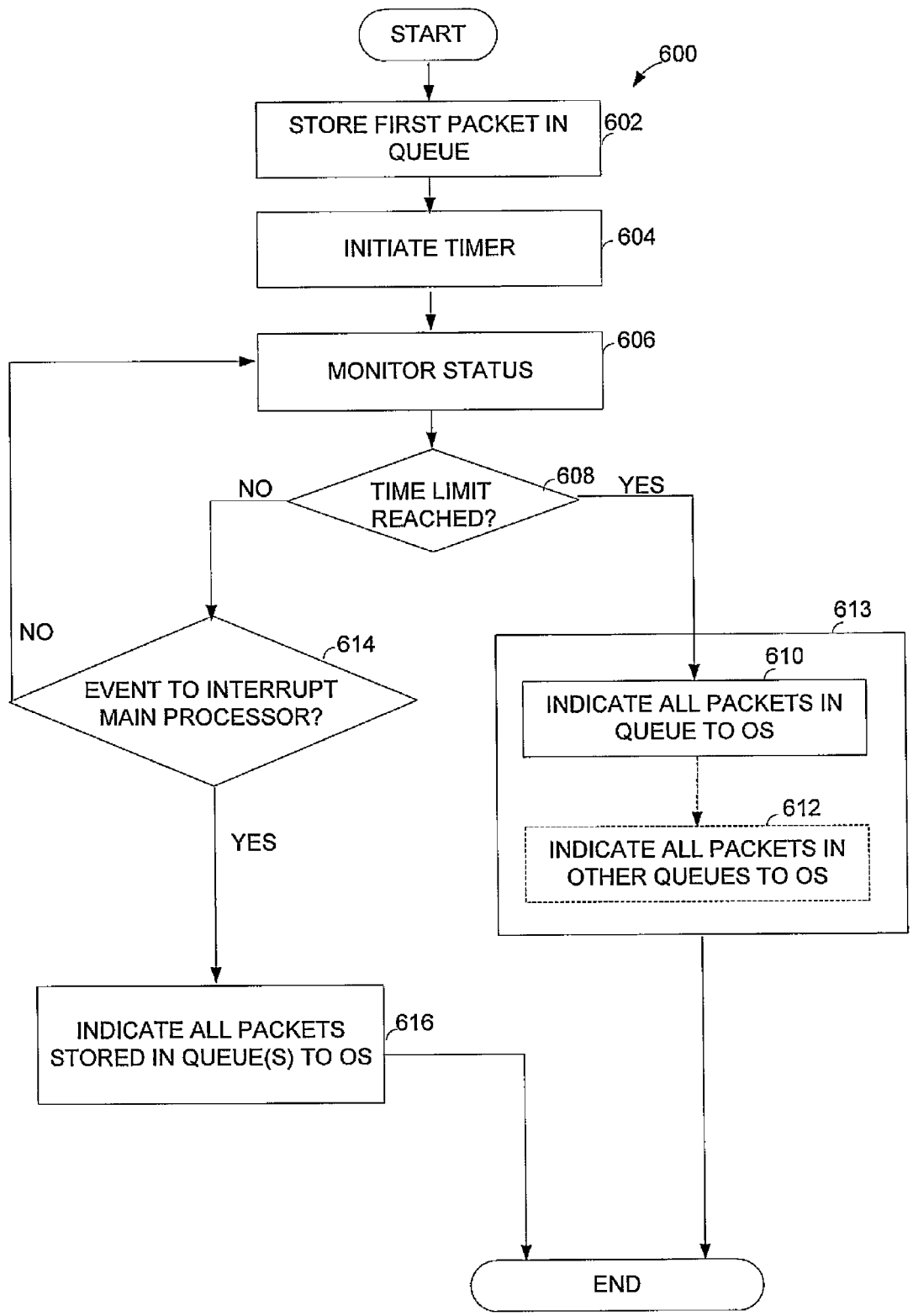
FIG. 6 is a flowchart of a method of operating one or more queues in a network interface according to some embodiments of the invention.

FIG. 6 illustrates in more detail a process 600 of delaying incoming packets by the NIC to be indicated to the operating system when the main processor may process them with less additional power, in accordance with some embodiments of the invention. The packets may be delayed by the NIC by being stored in one or more queues which may be any suitable component in memory of the NIC, a router or any other network component. In addition, the queues may be located outside of the NIC or any other network component performing filtering of incoming packets in accordance with the techniques described herein. One or more queues on the NIC are described in this example for illustration purposes.

Process 600 may start when a first packet is stored in the queue, at block 602. The queue may be generated on the NIC in accordance with criteria specified by the operating system. When the first packet is stored in the queue, a timer for the queue may be initialized, at block 604. The timer may be any suitable hardware component of the NIC programmed to monitor a status of the queue, as specified by the operating system. It should be appreciated that processing at block 604 may be performed at the same time as that at block 602.

The queue may have a time limit indicating a maximum duration of time that a packet may be stored in the queue. The time limit may be specified by the operating system based, for example, on a network protocol used to transmit the packet.

In addition to the time limit, any other suitable parameters may be associated with the queue. Thus, the queue may be associated with one or more filter criteria specified by the operating system that define what type of packets may be stored in that queue. The packets may be aggregated in the queue based on any suitable criteria of similarity, such as an allowable time to delay the packets, a common network protocol and any other suitable criteria. Also, a maximum size of the queue may be defined, as well as any other suitable parameters that may be used to store packets in the queue in accordance with the techniques described herein.

After the first packet is stored in the queue, a status of the queue may be monitored, at block 606. It should be appreciated that more packets may be added to the queue after the first packet, which is not shown in this example for the sake of simplicity. A number of packets that may be stored in the queue may be limited to the maximum size of the queue. Accordingly, the status of the queue storing one or more packets may be monitored, at block 606.

Next, at decision block 608, it may be determined whether the time limit of the queue has been reached for a packet in the queue. The time limit may be met when the timer determines that a time that the first packet has been stored in the queue has reached the time limit that a packet is allowed to be stored in the queue. If it is determined, at decision block 608, that the time limit of the queue is reached, process 600 may branch to block 610 where packets stored in the queue may all be indicated to the operating system. The queue may thus be emptied which is not shown in this example. Additionally, if the NIC stores packets in one or more of other queues, at block 610 packets stored in those queues may also be indicated to the operating system all at once, together with the packets indicated at block 610, as schematically shown in FIG. 6 by a block 613. The main processor may thus be interrupted, at block 613, only once to be notified of all packets stored in one or more queues on the NIC. Process 600 may then end.

If it is determined, at decision block 608, that the time limit of the queue is not expired, process 600 may follow to decision block 614 where it may branch depending on whether an event occurs that requires generating an interrupt to the main processor. As discussed above, the main processor may be interrupted to handle different types of events detected on the NIC, such as an arrival of a packet intended to the computing device or a packet for which the NIC could not determine an appropriate action, a packet being in a queue for the time limit of the queue, transferring a packet in a queue so that the queue's size limit is exceeded, receipt of a wake-up signal to wake up a computing device, and any other suitable events.

In embodiments where the computing device connects to one or more networks via multiple NICs, when one of these NICs wakes up the main processor for any of the above reasons, other NICs of the multiple NICs may determine that the main processor is now in a higher powered state. In response to the determination, the other NICs may deliver all of the packets stored in queues associated with those NICs to the operating system all at once. This allows all of the multiple NICs to indicate packets to the operating system at approximately the same time without having any explicit coordination between the NICs.

When any event requiring attention from the main processor occurs, process 600 may continue to block 616 where packets stored in one or more queues on the NIC or in any other suitable location may be indicated to the operating system all at once. It should be appreciated that processing at block 616 is similar to that at blocks 610 and 612. However, in this example, indicating the packets up at block 616 illustrates that the packets aggregated in the queue may be indicated to the operating system as a group not only when a time limit of the queue is reached, but when the processor is going to be interrupted for any suitable reason.

Having thus described several aspects of at least one embodiment of this invention, it is to be appreciated that various alterations, modifications, and improvements will readily occur to those skilled in the art.

Accordingly, it should be appreciated that embodiments described herein may be implemented in any suitable computing system. Furthermore, any types of network interfaces may be programmed to perform the selective filtering of incoming packets in accordance with techniques described herein. Also, the network interface may receive packets via any type of a network.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable storage media in any suitable form. For simplicity of illustration, data structures may be shown to have fields that are related through location in the data structure. Such relationships may likewise be achieved by assigning storage for the fields with locations in a computer-readable storage medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a network interface adapted for connecting a computing device to a network, wherein the computing device has a processor with a low power mode and a normal power mode, the method comprising:
the network interface receiving packets over the network; and
the network interface determining, for each packet of the received packets, an action to perform on the packet, including the network interface selecting the action from among at least indicating the packet to an operating system of the computing device immediately by a processor interrupt, delaying indication of the packet to the operating system, and discarding the packet,
wherein the network interface, when delaying indication of a packet, places the packet in a queue in the network interface, wherein delaying packets is performed while the processor is in the low power mode, and
wherein the network interface, when indicating a packet to the operating system immediately by the processor interrupt when the processor is in the low power mode, also indicates any packets in the queue to the operating system, and the processor exits the low power mode and switches to the normal power mode when the processor interrupt is generated.

2. The method of claim 1, wherein the queue is associated with a time limit indicating a maximum time a packet may be stored in the queue; and
when the maximum time is reached for a packet in the queue, a second processor interrupt is generated by the network interface, the second processor interrupt indicating to the operating system all packets stored in the queue.

3. The method of claim 2, wherein:
the network interface has a plurality of queues storing a plurality of packets; and
when the second processor interrupt is generated, the method further comprises indicating to the operating system all packets of the plurality of queues.

4. The method of claim 1, wherein a second processor interrupt is generated when a condition is met, the condition comprises at least one of, expiration of a time limit indicating a maximum time a packet may be stored in the queue, and transfer of a packet to the queue so that a maximum size of the queue is reached, the second processor interrupt indicating to the operating system all packets stored in the queue.

5. The method of claim 1, wherein determining the action comprises applying criteria of a plurality of filters specified by the operating system to the packet to identify a matching filter.

6. The method of claim 5, further comprising, when no matching filter is identified, performing an immediate action on the packet, the immediate action comprising an action selected from the group consisting of indicating the packet to the operating system and discarding the packet.

7. The method of claim 5, wherein a criterion of the plurality of filters is a type of the network.

8. The method of claim 5, further comprising:
obtaining at least one criterion for a first filter of the plurality of filters from at least one firewall rule.

9. The method of claim 8, wherein, when the received packet meets the at least one criterion of the first filter, the action comprises discarding the packet.

10. A network interface device adapted for connecting a computing device to a network, wherein the computing device has a processor with a low power mode and a normal power mode, the network interface device comprising:
circuitry separate from a processor of the computing device, the network interface being programmed with computer-executable instructions that, when executed, cause the network interface to selectively process packets received from the network by:
applying criteria of each of a set of filters to each received packet, a first filter identifying packets to discard, a second filter identifying packets to indicate to the operating system immediately by a processor interrupt, a third filter identifying packets to delay indication to the operating system when the processor is in a low power mode;
determining an action to perform on the packet, based on whether the packet meets criteria of any of the filters;
when the determined action comprises discarding the packet, discarding the packet;
when the determined action comprises delaying indication of the packet to the operating system, storing the packet in a queue in the network interface;
when the determined action comprises indicating the packet to an operating system of the computing device immediately, indicating the packet to the operating system immediately by a processor interrupt, and also indicating any packets in the queue to the operating system, wherein the processor exits the low power mode and switches to the normal power mode when the processor interrupt is generated.

11. The network interface device of claim 10, wherein the network interface comprises a network interface card.

12. The network interface device of claim 10, wherein the network interface is a component of a network gateway device separate from the computing device.

13. The network interface device of claim 10, wherein:
the network interface device further comprises a plurality of queues; and
storing the packet comprises storing the packet in a queue of the plurality of queues on the network interface.

14. The network interface device of claim 10, wherein:
the queue is associated with a time limit indicating a maximum storage time for a packet in the queue; and
the circuitry is configured to indicate all packets stored in the queue to the operating system when a second processor interrupt is generated when the maximum time is reached for a packet in the queue.

15. The network interface device of claim 14, wherein the circuitry is configured to generate the processor interrupt when at least one second packet classified as of immediate interest to the operating system is received and indicated to the operating system.

16. The method of claim 10, wherein a second processor interrupt is generated when a condition is met, the condition comprises at least one of, expiration of a time limit indicating a maximum time a packet may be stored in the queue, and transfer of a packet to the queue so that a maximum size of the queue is reached, the second processor interrupt indicating to the operating system all packets stored in the queue.

17. At least one computer-readable storage medium, comprising at least one of a memory device and a storage device, encoded with computer-executable instructions that, when executed with at least one processor, perform a method of operating a network interface adapted for connecting a computing device to a network, wherein the computing device has a processor with a low power mode and a normal power mode, the method comprising:
programming circuitry of the network interface to process received packets using sets of filter criteria, a first set of filter criteria identifying packets to discard, a second set of filter criteria identifying packets to indicate to the operating system immediately by a processor interrupt, a third set of filter criteria identifying packets to delay indication to the operating system when the processor is in a low power mode; and
the network interface receiving a plurality of packets over the network; and
the network interface applying the sets of filter criteria to the packet to determine an action to perform on the packet, the determined action for the packet being determined by the sets of filter criteria and including indicating the packet to the operating system immediately by a processor interrupt, delaying indication of the packet to the operating system, and discarding the packet;
wherein when the determined action comprises delaying indication of the packet to the operating system, storing the packet in a queue in the network interface, wherein delaying packets is performed while the processor is in the low power mode, and
wherein when the determined action comprises indicating a packet to the operating system immediately by the processor interrupt when the processor is in the low power mode, also indicating any packets in the queue to the operating system, wherein the processor exits the low power mode and switches to the normal power mode when the processor interrupt is generated.

18. The at least one computer-readable storage medium of claim 17, wherein the computer-readable storage medium comprises a semiconductor chip on the network interface.

19. The at least one computer-readable storage medium of claim 18, wherein the network interface comprises a component of a network gateway having a network interface adapted to receive the sets of filter criteria over a network.

20. The at least one computer-readable storage medium of claim 17, wherein:
the queue is associated with a time limit indicating a maximum time a packet may be stored in the queue; and
a second processor interrupt is generated when a packet has been stored in the queue for the time limit.

* * * * *